United States Patent [19]
Vredenburgh

[11] Patent Number: 5,754,097
[45] Date of Patent: May 19, 1998

[54] CONSPICUOUS LIGHTING DISPLAY SYSTEM FOR MOTORCYCLES

[76] Inventor: Alison G. Vredenburgh, 2295 Cameo Rd., Carlsbad, Calif. 92008

[21] Appl. No.: 675,239

[22] Filed: Jul. 2, 1996

[51] Int. Cl.⁶ .................................................. B62J 3/00
[52] U.S. Cl. .................... 340/432; 340/331; 340/468; 340/471; 362/72
[58] Field of Search ........................ 340/427, 432, 340/463, 469, 471, 472, 473, 331, 332, 468; 362/72

[56] References Cited

U.S. PATENT DOCUMENTS

| | | | |
|---|---|---|---|
| 3,916,377 | 10/1975 | Demeter | 340/472 |
| 4,011,443 | 3/1977 | Smith et al. | 340/432 |
| 4,127,844 | 11/1978 | Purdy . | |
| 4,290,047 | 9/1981 | Latta, Jr. | 340/432 |
| 4,550,305 | 10/1985 | Bookbinder | 340/432 |
| 4,794,494 | 12/1988 | Reeder | 362/72 |
| 5,264,826 | 11/1993 | Henderson et al. | 340/432 |
| 5,477,208 | 12/1995 | Henderson et al. | 340/432 |
| 5,580,152 | 12/1996 | Carter | 362/72 |

FOREIGN PATENT DOCUMENTS

| | | | |
|---|---|---|---|
| 2703387 | 8/1978 | Germany | 340/432 |
| 2131149 | 6/1984 | United Kingdom | 340/432 |

OTHER PUBLICATIONS

Ramsey & Brinkley, "Enhanced Motorcycle Noticeability Through Daytime Use of Visual Signal Warning Devices", Jun. 1977, vol. 9, No. 2, Journal Safety Research.
"Living with Epileptic Seizures", Samuel Livingston M.D., p. 53, 1963.
"Epilepsy Guide", Ernst Niedermyer M.D., p. 74 1983.
"Neurotransmitters, Seizures and Epilepsy", P.L. Morselli M.D. et al, 1981.
"Sensory Precipitation Reflex Mechanisms", R.G. Brickford, p. 545, 1969.
"Relationship of Some Varieties of Electroencephalographic Photosensitivity to Clinical Convulsive Disorders", E.L. Reilly et al., Neurology, vol. 23, Oct. 1973.

*Primary Examiner*—Brent A. Swarthout
*Attorney, Agent, or Firm*—Gordon A. Shifrin

[57] ABSTRACT

The present invention particularly addresses the issue of safely for motorcycles with respect to enhanced visual awareness on the part of automobile drivers by making the motorcycles significantly more conspicuous. Important features of the invention include flashlamps fired randomly at frequencies selected to be particularly attractive to drivers, a geometrical array for the flashlamps that defines the vehicle as a motorcycle, a forward illumination pattern that provides visibility where it is most needed, and a means for preventing operation during nighttime conditions.

11 Claims, 2 Drawing Sheets

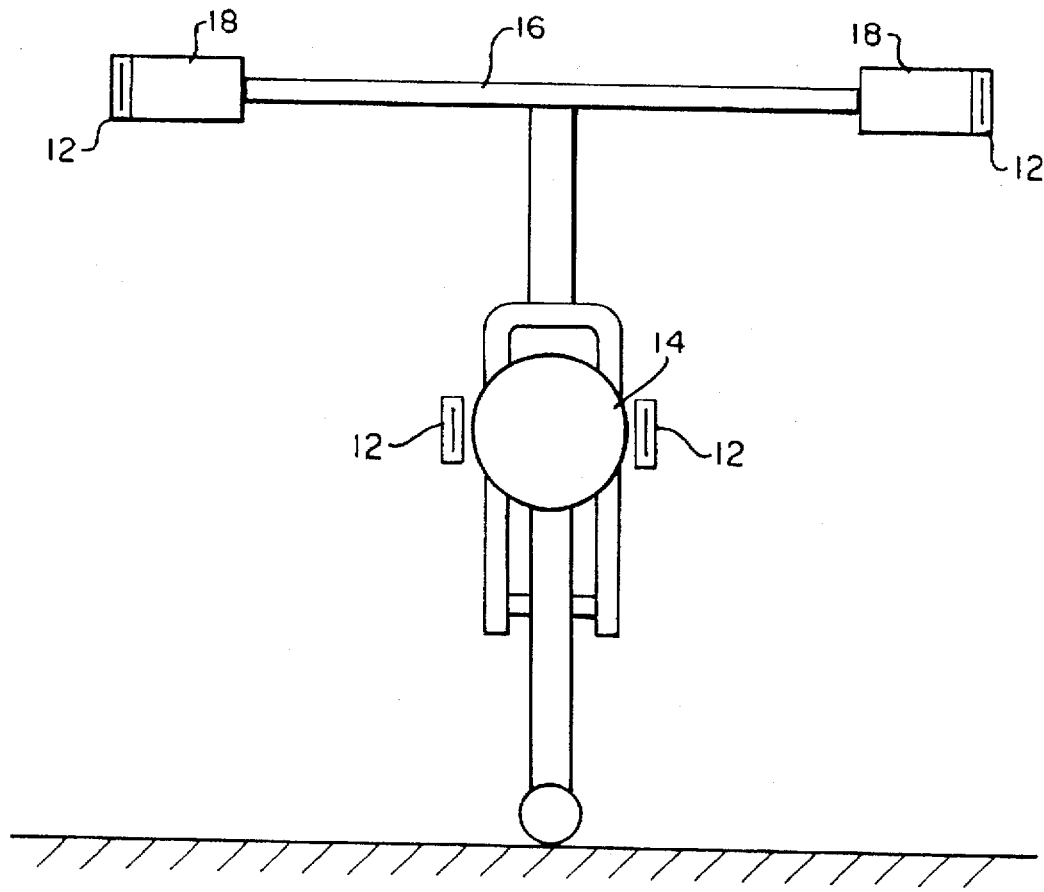
FIG. 1
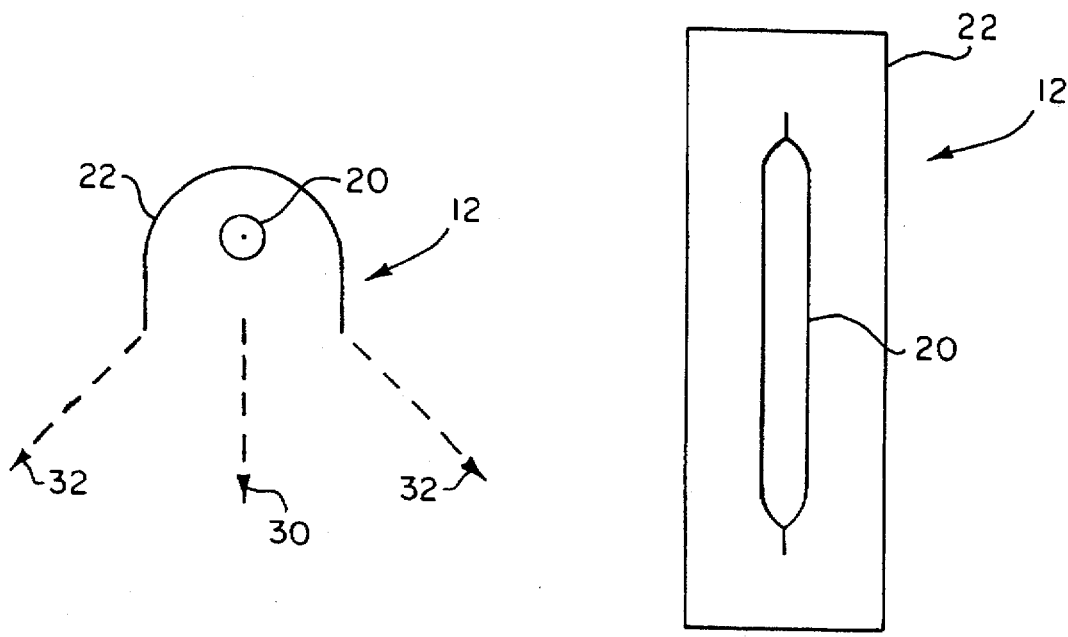
FIG. 2a
FIG. 2b

CONSPICUOUS LIGHTING DISPLAY SYSTEM FOR MOTORCYCLES

FIELD OF THE INVENTION

The present invention relates to the area of safety lighting for motorcycles. Particular attention is given to improving various lighting features of motorcycles so as to make them more conspicuous to automobile drivers.

OBJECTIVES OF THE INVENTION

The main objective of this invention is to improve safety for the operation of motorcycles by employing a bright flashing light system that is particularly visible and attractive to the attention of automobile drivers under daylight conditions. An additional objective is to prescribe the frequency of flashing within a range well removed from that which might induce seizures in susceptible people who are afflicted with epilepsy. It is a further objective to provide a simple and inexpensive lighting display.

BACKGROUND OF THE INVENTION

Safety has been a paramount concern for operators of motorcycles since the beginning of their use. Certain features of these vehicles relating to their vulnerability have been noted with respect to dynamic instability and the lack of physical protection for the operator in the event of a collision. Two additional features relating to safety involve how motorcycles are perceived by drivers of ordinary motor vehicles: (1) limited experience in dealing with motorcycles on the road because of their relatively small population and (2) limited visual awareness because motorcycles are much smaller than typical automobiles. These features are particularly important because a major cause of collisions is that the motorcycle is not seen or not promptly noticed by the driver of the automobile.

In the interest of safety, substantial effort has been put forth to enhance the conspicuity of motorcycles. Much prior art is directed toward improving visual awareness for automobile drivers with whom the motorcyclists must compete for the same road space.

For example, it is common practice to operate the motorcycle headlight continuously when the vehicle is on the road during daylight hours.

DESCRIPTION OF THE PRIOR ART

A pertinent article on the subject of motorcycle safety "Enhanced Motorcycle Noticeability Through Daytime Use of Visual Signal Warning Devices" was published by Ramsey and Brinkley, in the "Journal of Safety Research," June 1977, pages 77–84. This paper deals with field tests to determine the effectiveness of various warning devices on motorcycles.

In the prior art devoted to motorcycle safety, a variety of enhanced lighting systems and other visual displays have been described. Flashlamps have been employed to make motorcycles more conspicuous. Flashlamp operation has been involved and coordinated with the simultaneous operation of brakes, turn signals, throttle, or ignition. Some prior art devices have provided other kinds of supplementary lights such as elevated tail lights. Representative examples of enhanced lighting systems in the prior art are provided with the following:

Demeter in U.S. Pat. No. 3,916,377 employs a warning device in the form of a strobe light mounted on a pole at the rear of the vehicle. The light is energized to emit brilliant flashes at a rate of approximately one hertz. The lamp is designed to radiate through 360 degrees with respect to the vehicle during daylight hours. At night, covers are provided to alter the illumination so as to be primarily in the vertical direction permitting flashes to be seen from a long distance.

Smith et al in U.S. Pat. No. 4,011,443 also employs a safety light assembly mounted on a pole at the rear of the vehicle. The light is illuminated continuously and is provided with an amber colored transmitting cover that faces forward and a red colored transmitting cover that faces rearward. The system is arranged to display this illumination automatically when the ignition is activated and to continue as long as the engine is running.

Purdy in U.S. Pat. No. 4,127,844 describes a warning system comprising a high-intensity flashlamp and associated circuitry that operates in combination with the vehicle's brakes, turn signals, and emergency flasher lights. Several arrangements are described with respect to activation and location of flashlamps. The flashlamp is activated in response to each engagement of the brake. Lamps can be located adjacent to the turn signals and can be dimmed under nighttime driving conditions Bookbinder in U.S. Pat. No. 4,550,305 describes a lighting system with pulsating strobe lamps visible from both the front and rear of the motorcycle. The system can be manually activated. Further it is designed to operate in conjunction with the throttle, clutch, and brakes of the vehicle.

BRIEF DESCRIPTION OF THE INVENTION

With respect to enhanced safety, the present invention particularly addresses the issue of visual awareness. In this regard, prior art is exceeded by making motorcycles significantly more conspicuous to automobile drivers, particularly under those circumstances for which the majority of collisions occur. No operational interconnection is involved with the ignition, brakes, turn signals, or throttle of the motorcycle.

In the present invention, bright flashing lights are employed in a manner that particularly commands the attention of automobile drivers. This result is accomplished by employing a plurality of flashlamps mounted in a prescribed geometrical configuration that identifies the vehicle as being a motorcycle and distinguishes it from an automobile. Further these flashlamps radiate with a spectrally broad visible display, a specified range of angular illumination, a prescribed operating range of flashing frequency, and a prescribed flashing mode. Blue or red lights are not employed so as to avoid conflict or confusion with lights displayed on vehicles used by police or fire departments.

The lighting system is intended to operate only under daylight conditions during which occur two-thirds of collisions between automobiles and motorcycles. This feature is achieved with an ambient light sensor means that prevents activation of the system when the intensity of such ambient light falls below a specified minimum value. An additional feature prevents undesired activation of the system at night from momentary or spurious bright sources.

The most common (ninety percent) type of collision occurs at an intersection as the automobile driver begins a left turn while the motorcycle continues moving straight ahead. To address this hazard, outgoing illumination from the system is confined to and particularly directed to a limited angular range nominally in the forward direction; flashes are not observed from the side or from the rear of the motorcycle.

Flashlamps working together in an array are activated in random fashion; such randomness applies to both the instantaneous pattern of lights actually activated and the intensity of individual flashlamps. These features render the total momentary lighting display to be essentially unpredictable. Further, the number of flashes per unit time is confined to a range that is removed from a particular frequency range that is capable of causing epileptic seizures in susceptible persons.

These results are achieved with commercial flashlamps plus circuitry comprised entirely of an aggregation of commercially available electronic components. The final package employed for flashlamp activation is a simple, compact, and inexpensive electronic unit that can be easily installed on a motorcycle.

BRIEF DESCRIPTION OF THE DRAWINGS

FIG. 1 illustrates schematically the front view of a motorcycle equipped with a set of four flashlamp assemblies in a preferred configuration.

FIGS. 2a and 2b are schematic illustration showing details of a flashlamp assembly and the relationship between the parts.

DETAILED DESCRIPTION OF THE INVENTION

Figure 3:
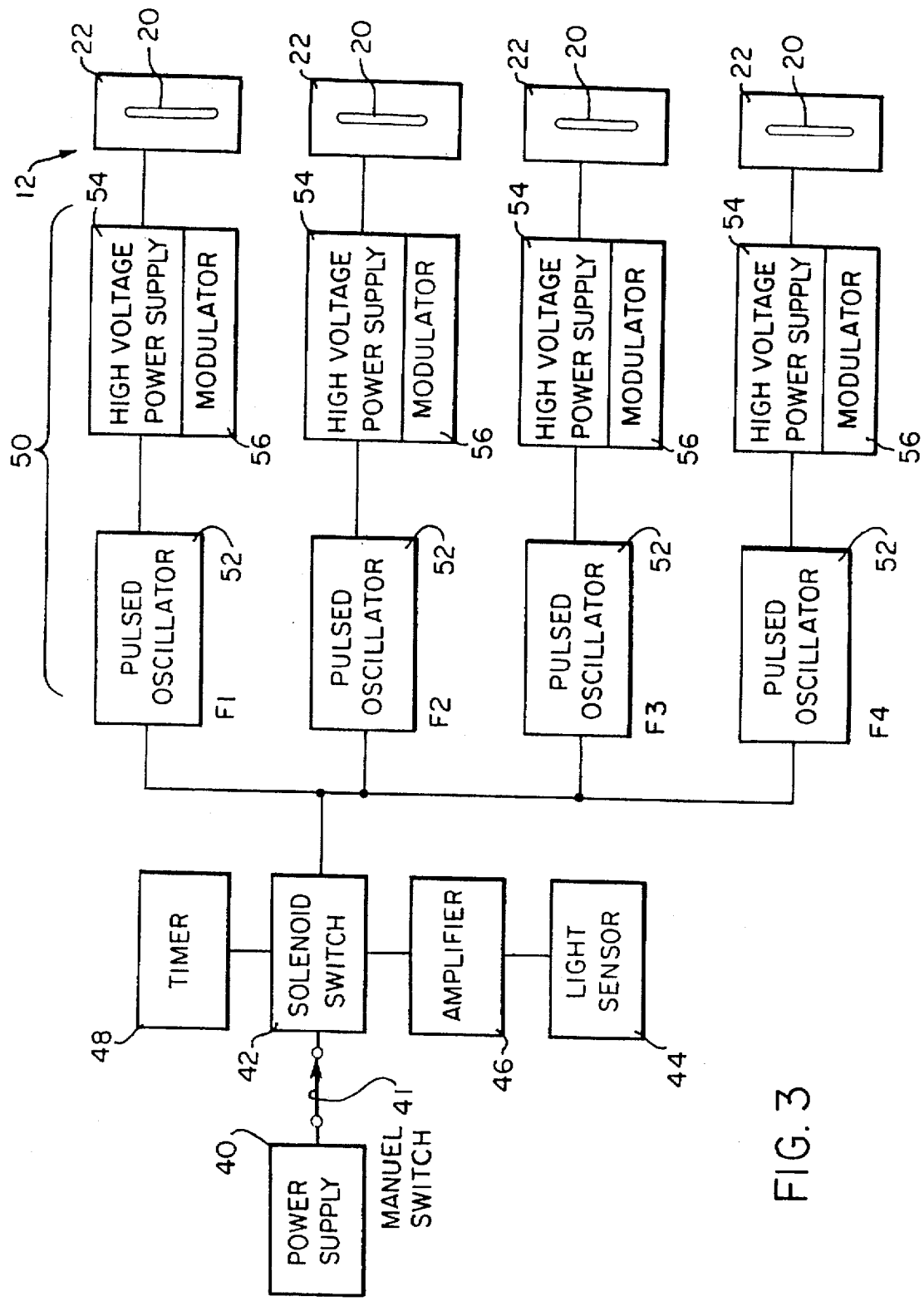
FIG. 3 is a functional block diagram of the aggregation of commercial electronic circuit components that are employed to control the lighting system and activate the flashlamps.

As illustrated in FIG. 1, a plurality of flashlamp assemblies is mounted as seen in a front view of a motorcycle shown here only schematically. In the preferred configuration of FIG. 1, the plurality of flashlamp assemblies consists of four assemblies 12 arranged in a nominally U-shaped or nominally trapezoidal shaped array and arranged to display and illuminate in the nominal forward direction. Such an array identifies the vehicle as a motorcycle when it is seen by other drivers. Two flashlamp assemblies 12 are mounted in the vicinity of the forward portion of each rear view mirror 18 mounted near either end of handlebar 16. Two flashlamp assemblies are mounted on either side of headlamp 14. If the headlamp is not located in the general area indicated, then two flashlamp assemblies can be mounted at a low level on either side of the wheel fork. This configuration along with details of the flashlamp assemblies to be described assure that flashlamps are visible primarily from the forward angular region.

A further feature of this mounted configuration is that the entire array of flashlamp assemblies turns along with the steering mechanism of the motorcycle, in particular turning along with the handlebar and headlamp. Thus as the motorcycle is turned, the desired warning to oncoming traffic is displayed by the lighting system automatically in the anticipated direction of movement.

FIG. 2a and FIG. 2b provide construction details of a typical flashlamp assembly 12. This assembly consists of two basic parts: the flashlamp itself and the optical element that functions as both a reflector and a shield. FIG. 2a is an end view of an assembly 12 showing the flashlamp 20 mounted axially in the said optical element which is reflector 22. FIG. 2b shows a front view of flashlamp assembly 12. Typical flashlamp 20 is shown to lie in a nominal axial orientation within the confines of reflector 22; the reflector partially surrounds the flashlamp and (to further improve reflection) extends in the axial direction substantially beyond either end of the flashlamp.

Reflector 22 greatly increases the effective operational brightness of flashlamp 20 by reflecting and re-directing the full circle of light generated by the flashlamp into the forward angular region where it is most needed as the useable outgoing illumination. Reflector 22 also acts as a shade or shield to prevent light from being seen from the side or the rear of the motorcycle. This desired shielding and angular limitation are assured (as shown in FIG. 2a) by extending the flanks of reflector 22 ahead of flashlamp 20 so that internal reflections will not direct rays beyond the prescribed angular range.

Arrow 30 in FIG. 2a indicates the direction straight ahead. Arrows 32 define the forward angular range and indicate typical angular limits to the observed light in the nominal forward direction resulting from the combined action (reflecting and shielding) of reflector 22. A representative forward angular range of outgoing illumination between arrows 32 would be limited to about 45 degrees on either side of direction 30 straight ahead.

FIG. 3 is a functional block diagram of the essential electrical components needed to operate the flashlamp system. An aggregation of readily available commercial electronic components is employed. Power supply 40 is a basic low voltage DC source such as a battery; the required power also could be obtained from the standard battery of the motorcycle itself. Manual switch 41 connects the power supply to the remainder of the system. Solenoid switch means 42 connects or disconnects the flashlight system automatically from the remainder of the system, as will be described. Switch means 42 is controlled and signaled by ambient light sensor means 44 acting through its associated amplifier means 46. Sensor 44 could be a conventional photodiode or any other solid state photo sensitive element. Amplifier means 46 provides sufficient output to operate switch 42 when so driven by light sensor means 44. A prescribed minimum level of ambient light intensity represents daylight conditions; when that sufficient ambient light level is present, switch 42 remains closed. When the ambient light intensity falls below this minimum level, switch 42 is opened by sensor means 44 acting through amplifier means 46, thus preventing operation of the flashlamps. These features assure operation of the lighting system only under essentially daylight conditions.

As a further restriction against nighttime operation, timer means 48 is provided. Timer means 48 also allows the lighting system to be turned on if sensor means 44 is illuminated at above the prescribed minimum daylight intensity. If, however, that level of intensity persists for less than a prescribed minimum time interval, timer means 48 prevents the system from being turned on. A typical minimum time interval for this purpose is about thirty seconds. Thus, in the event manual switch 41 has not been opened by the operator in anticipation of nighttime, timer means 48 prevents activation of the system by a spurious bright source such as a street lamp. Such a spurious source, for example, could illuminate sensor 44 momentarily as the motorcycle passes by; but as explained, the safety lighting system can be activated only if such ambient lighting above the prescribed minimum intensity persists for longer than the prescribed minimum time interval.

In FIG. 3, a plurality of four circuit groups 50 is shown as being driven from basic low voltage power supply 40. A matching plurality of flashlamps 20 is provided. Each member of such circuit group 50 operates an associated member of the plurality of flashlamps. Each circuit group 50 consists of three electronic units: a nominally fixed-frequency pulsed oscillator means 52 employing and operating at an allowed frequency, a high voltage power supply means 54, and a random amplitude modulation means 56 that is associated with high voltage power supply means 54 and is capable of varying its output voltage. The combination of pulsed oscillator means and high voltage power supply means produces a sequence of pulses that drives and activates associated flashlamp 20. The output voltage of high voltage power supply means 54 is matched to, and as modulated, always remains within, the activation voltage requirements of flashlamp 20.

Although random amplitude modulation means 56 varies the output voltage of high voltage power supply 54, that modulated output value is confined to an amplitude range lying within the activation value for the associated flashlamp. Such amplitude modulation further contributes to the desired instantaneous randomness of the total lighting display.

The typical allowed operating frequency range of pulsed oscillator means 52 is specified within the narrow range of approximately 70 to 80 pulses per minute; the resulting flashing rate would, of course, be the same. This specified range is selected for two reasons. Research by the inventor has shown that this range most particularly attracts the attention of automobile drivers who otherwise might be less likely to see the motorcycle. An additional reason is that this range is substantially removed from the value (variously reported as starting at about two hertz and extending up to about six hertz) that is capable of inducing epileptic seizures in susceptible persons. Pertinent references in the literature regarding epileptic seizures are included in the Information Disclosure Statement.

As indicated above, within the plurality of circuit groups 50, all individual pulsed oscillator means 52 operate at frequencies confined to the range of approximately 1.167 to 1.333 hertz. It is important to this invention, however, that no two pulsed oscillator means operate at identical frequencies. Therefore to avoid this eventuality, each pulsed oscillator means 52 is tuned to its unique, individual, and nominally fixed frequency, while still operating within the specified narrow range of about 70 to 80 flashes per minute. Minor expansion of this range would still be within the scope and spirit of this invention. If four flashlamps are employed, the operating frequencies could be designated as F1, F2, F3, and F4 (see FIG. 3). As a representative example, let the allowed frequency range within which the pulsed oscillators are tuned be from 1.20 to 1.32 hertz.

To continue with the representative example, the following frequencies might be employed: F=1.20, F=1.24, F=1.28, and F=1.32 hertz. Thus for this preferred embodiment, any four different and essentially fixed frequencies could be selected, so long as they are confined to the specified range. In this manner, the resulting instantaneous visible pattern of lights is essentially random. This randomness feature further improves the effectiveness of the lighting system because an unpredictable and fluctuating display provides enhanced conspicuity.

In summary, several operational features of the invention, as described in this disclosure, contribute to and provide for instantaneous randomness for both flashlamp intensity and the displayed pattern of lights.

This invention may be embodied and practiced in other specific forms without departing from the spirit and essential characteristics thereof. Therefore, the present embodiments are considered in all respects as illustrative and not restrictive. The scope of the invention is indicated by the appended claims rather than the foregoing description. All substitutions, variations, and changes that come within the meaning and range of equivalency of the claims therefore are intended to be embraced therein.

What is claimed is:

1. A conspicuous safety lighting system for motorcycles comprising in combination:

a basic low voltage DC power supply means, a manual switch that connects the power supply to the remainder of the lighting system, a solenoid switch means that can automatically connect or disconnect the low voltage DC power supply means from the remainder of the lighting system, an ambient light sensor means, an amplifier means associated with the ambient light sensor means that provides sufficient output to open the solenoid switch means when the intensity of ambient light falls below a prescribed minimum level, a timer means that prevents operation of the lighting system under nighttime conditions in response to spurious light sources brighter than said prescribed minimum level of ambient light intensity should those bright sources persist for less than a prescribed minimum time interval, and a plurality of circuit groups driven through said solenoid switch means;

(a) each member of said plurality of circuit groups consists of three electronic units: an essentially fixed-frequency pulsed oscillator means employing an allowed operating frequency, an associated high voltage power supply means, and an associated random amplitude modulation means that can vary the output voltage of the high voltage power supply means;

(b) each member of said plurality of circuit groups drives and activates an associated flashlamp; each flashlamp is a member of a plurality of flashlamps;

(c) each flashlamp is part of a flashlamp assembly that consists of the flashlamp itself that is mounted axially within a partially enclosing optical element functioning as both a reflector that enhances observed intensity of the outgoing illumination and as a shield that limits the visible angular range of the outgoing illumination.

2. The safety lighting system disclosed in claim 1, wherein for each member of the plurality of circuit groups, the fixed frequency oscillator means drives the associated high voltage power supply means; the output voltage of each high voltage power supply means is matched to the activation voltage requirements of the associated flashlamp; each high voltage power supply means is equipped with an amplitude modulation means that randomly varies its output voltage so as to vary correspondingly the intensity of the flashlamp; the output voltage as modulated always remains within the activation voltage requirements of the flashlamp.

3. The safety lighting system disclosed in claim 1 wherein the allowed operating frequency of each fixed-frequency pulsed oscillator means is both unique and different from the other allowed frequencies so that the instantaneous visual display of flashing lights is essentially random and unpredictable.

4. The allowed range of operating frequencies of fixed-frequency pulsed oscillators disclosed in claim 3 are confined to the range of approximately 70 to 80 flashes per minute.

5. The safety lighting system disclosed in claim 1 wherein the optical element partially surrounds the flashlamp that is mounted essentially axially within the optical element; the optical element re-directs and reflects the full circle of light generated by the flashlamp so as to enhance the useable outgoing illumination in the forward angular region.

6. The optical element disclosed in claim 5 restricts and shields the useable outgoing illumination so as to be contained within a projected angular range that is approximately 45 degrees on either side of the forward direction of the motorcycle.

7. The safety lighting system disclosed in claim 1 wherein the plurality of flashlamp assemblies consists of four assemblies mounted in a nominal U-shaped configuration; two assemblies of the plurality of flashlamp assemblies are mounted facing forward in the vicinity of the forward portion of each rear view mirror that in turn is mounted near either end of the handlebar of the motorcycle, and two assemblies are mounted facing forward on either side of the headlamp of motorcycle.

8. The safety lighting system disclosed in claim 1 wherein the plurality of flashlamp assemblies consists of four assemblies mounted in a nominal trapezoidal configuration, two assemblies of the plurality of flashlamp assemblies are mounted facing forward in the vicinity of the forward portion of each rear view mirror that in turn is mounted near either end of the handlebar of the motorcycle, and two assemblies are mounted facing forward on either side of the wheel fork of the motorcycle.

9. The safety lighting system disclosed in claim 1 wherein the said ambient light sensor means is a photodiode.

10. The prescribed minimum time interval for the timer means disclosed in claim 1 is approximately thirty seconds.

11. The safety lighting system disclosed in claim 1 wherein the basic low voltage DC power supply means is a battery.

* * * * *